United States Patent
Boersma et al.

(10) Patent No.: US 8,449,025 B2
(45) Date of Patent: May 28, 2013

(54) ROOF ASSEMBLY AND METHOD OF MOUNTING A SIEVE MEMBER

(75) Inventors: Egbert Boersma, Helmond (NL); Michael Cornelis Anthonius Relouw, Merselo (NL); Danny Wilhelmus Arend Kok, Arnhem (NL); Leonardus Gerardus Maria Verbeek, Venray (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/012,204

(22) Filed: Jan. 24, 2011

(65) Prior Publication Data

US 2011/0181077 A1 Jul. 28, 2011

(30) Foreign Application Priority Data

Jan. 26, 2010 (EP) .................................. 10151634

(51) Int. Cl.
*B60J 7/00* (2006.01)
(52) U.S. Cl.
USPC ...................................... 296/213; 296/216.08
(58) Field of Classification Search
USPC ................. 296/213, 216.08; 52/11–12, 15–16
See application file for complete search history.

(56) References Cited

U.S. PATENT DOCUMENTS

| | | | | |
|---|---|---|---|---|
| 474,442 | A * | 5/1892 | Byers et al. ................... | 210/477 |
| 753,660 | A * | 3/1904 | Boyer ........................... | 405/119 |
| 2,457,940 | A * | 1/1949 | Swenson ....................... | 210/477 |
| 2,461,610 | A * | 2/1949 | Lord ................................ | 52/12 |
| 4,726,090 | A * | 2/1988 | Kilpatrick ................... | 15/236.04 |
| 4,964,247 | A * | 10/1990 | Spica ................................. | 52/12 |
| D380,655 | S * | 7/1997 | Dillon .............................. | D8/13 |
| 5,718,472 | A * | 2/1998 | Otake et al. .................... | 296/221 |
| 5,875,590 | A * | 3/1999 | Udelle ............................. | 52/16 |
| 6,196,625 | B1 * | 3/2001 | Nagashima et al. .......... | 296/213 |

(Continued)

FOREIGN PATENT DOCUMENTS

| DE | 3803361 A1 | 8/1988 |
|---|---|---|
| DE | 4330582 C1 | 10/1994 |
| DE | 19540413 C1 | 10/1996 |

(Continued)

OTHER PUBLICATIONS

European Search Report of the European Patent Office Patent Office in counterpart foreign application No. 1015163 filed Jan. 26, 2010.

*Primary Examiner* — Dennis Pedder
(74) *Attorney, Agent, or Firm* — Steven M. Koehler; Westman, Champlin & Kelly, P.A.

(57) ABSTRACT

Aspects of the invention relate to a roof assembly for a vehicle having a roof opening in its fixed roof. It comprises a stationary part having longitudinal guides positioned on either side of the roof opening. A closure is movable at least between a closed position closing the roof opening and an open position in which the closure is at least partly opening the roof opening. A closure operating mechanism is provided for opening and closing the closure, and is sliding in said longitudinal guides when opening and closing the closure. The longitudinal guides each comprise at least a drain channel and a water drainage member for draining water from said longitudinal drain channel to a water drainage hose. Each water drainage member communicates with the respective drain channel on one end, and connects to the corresponding water drainage hose on its opposite end to form a drain. A sieve member for catching debris but allowing water to run through is provided in the drain upstream of said water drainage member.

23 Claims, 16 Drawing Sheets

U.S. PATENT DOCUMENTS

2005/0093315 A1* 5/2005 Mitchener ................ 294/51
2006/0075689 A1* 4/2006 Hawash ..................... 52/12
2008/0224503 A1 9/2008 Betzl

FOREIGN PATENT DOCUMENTS

DE 10232579 * 2/2004
DE 102005043020 B3 2/2007

* cited by examiner

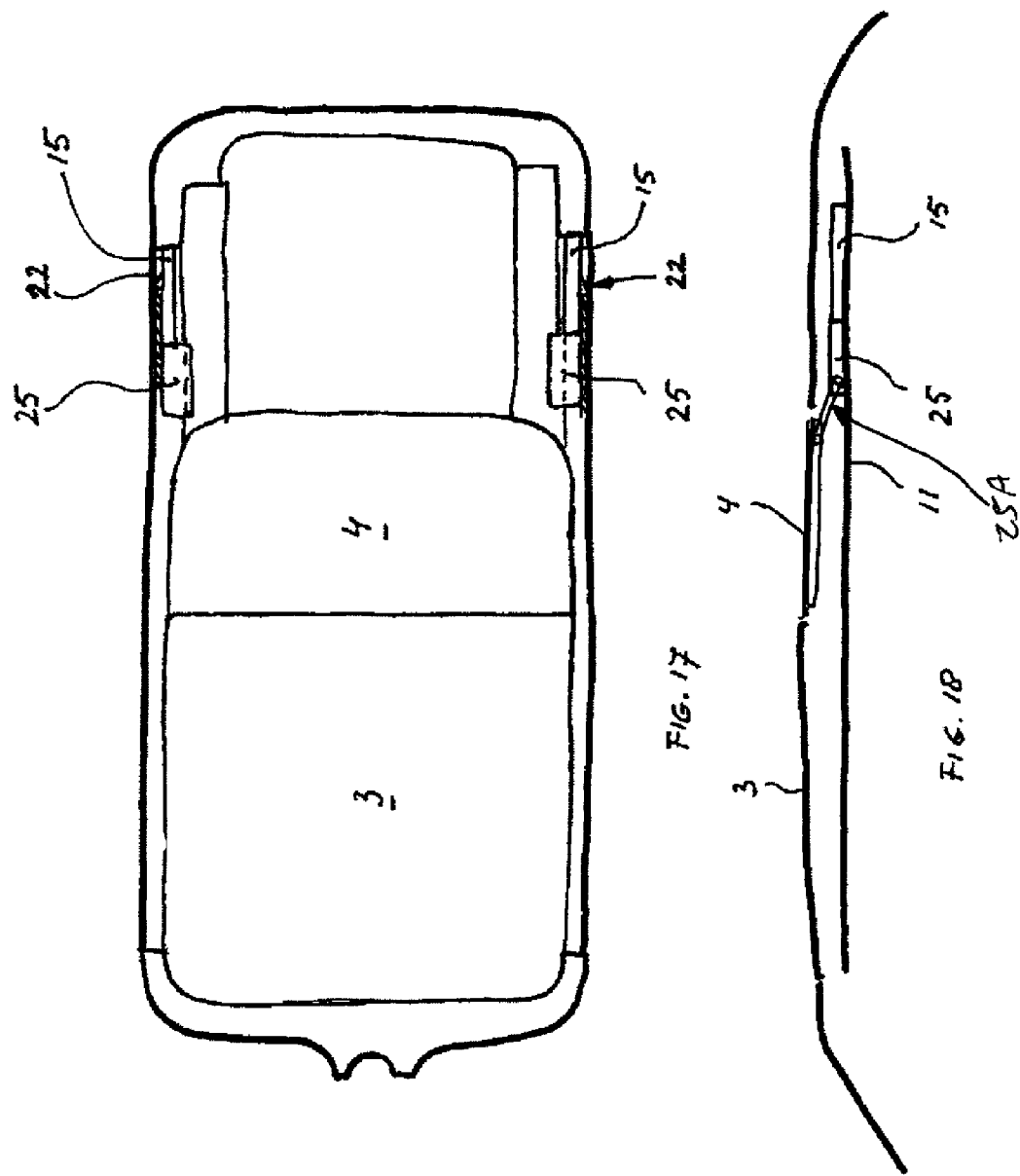

ROOF ASSEMBLY AND METHOD OF MOUNTING A SIEVE MEMBER

BACKGROUND

The discussion below is merely provided for general background information and is not intended to be used as an aid in determining the scope of the claimed subject matter.

Aspects of the invention relate to a roof assembly for a vehicle having a roof opening in its fixed roof, comprising a stationary part having longitudinal guides positioned on either side of the roof opening, a closure movable at least between a closed position closing the roof opening and an open position in which the closure is at least partly opening the roof opening, a closure operating mechanism for opening and closing said closure, said operating mechanism sliding in said longitudinal guides when opening and closing said closure, and wherein said longitudinal guides each comprise at least a drain channel and a water drainage member for draining water from said drain channel to a water drainage hose, each water drainage member communicating with the respective drain channel on one end, and connecting to the corresponding water drainage hose on its opposite end to form a drain.

Such roof assembly is known in various embodiments.

A problem with such roof assemblies is that the water drainage member or hose can become clogged due to debris containing for example dirt and leaves accumulating in the drain channel and flushed to the drainage member.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the invention proposes to use a sieve member for catching debris but allowing water to run through, said sieve member being provided in the drain upstream of said water drainage member.

Due to this sieve member, the debris cannot reach the drainage member. The shape of the sieve member can be easily chosen such that water can still seep through even if debris have accumulated in front of the sieve, so that a total blockage of the drain will not occur.

In a first embodiment, the sieve member is mounted to said longitudinal guide, and in particularly mainly in said drain channel. In this way, the dirt and leaves will remain in the drain channel where it is relatively easy to collect and remove the dirt and/or leaves. This embodiment is also suited for mounting the sieve after the roof assembly has been built in the vehicle, as the drain channel can easily be reached from inside or outside the vehicle.

In a particular embodiment the sieve member is fixed in said drain channel and in one embodiment is elongated and has a generally U-shaped cross section fitting within said drain channel with space between the bottom of said sieve member and the drain channel, the bottom of said elongated sieve member having openings and the end of the sieve member adjacent the water drainage member being at least partly closed.

In this embodiment, the water may seep through the bottom of the sieve member over a relatively great length, thereby further reducing the risk of blocking the sieve member.

In another embodiment, the sieve member is slidably mounted to said longitudinal guide and is operatively connected to said operating mechanism, said sieve member being constructed as a scraper. In this embodiment, the sieve member will follow movements of the closure operating mechanism, and will scrape any collected dirt and leaves forwardly, which makes removal easier.

In one development thereof, the roof assembly comprises a transverse water drain channel capable of collecting and draining water into said drain channel, said water drain channel having supports that are slidably connected to said longitudinal guides, said sieve members being connected to said water drain channel supports, for example directly fixed thereto.

In another embodiment, the water drainage member is provided with a drain pipe for mounting the drainage hose, the sieve member having a mounting part fixed within the drain pipe and a sieve part protruding upstream from the mounting part. This leads to a very simple sieve member.

The sieve member may be detachable, for example the sieve member may comprise clip fixing members, to fix or detach said sieve to or from said longitudinal guide member, and/or to said water drainage member, and/or to said water drain channel support.

An aspect of the invention also includes a method of mounting a sieve member to a vehicle comprising such roof assembly as defined above, comprising the steps of:

setting the closure operating mechanism in its maximally forward position in the longitudinal guides such that closure is moved away from the rear side of the roof opening and the drain channel can be reached there, positioning the sieve member in the drain channel in a position behind the operating mechanism, moving the sieve member rearwardly to its position of use.

By using this method, it is not necessary to demount or dismantle a roof assembly for the vehicle in order to be able to install the sieve assembly in existing roof assemblies.

This method may include the step of actuating the closure operating mechanism such that it moves to its maximally rearward position thereby taking along the sieve member at least partly to its position of use.

BRIEF DESCRIPTION OF THE DRAWINGS

Further details and advantages of aspects of the invention follow from the description with reference to the drawings showing embodiments of the invention by way of example.

FIGS. 15-18 schematically illustrate a method for positioning a sieve member in a roof assembly.

DETAILED DESCRIPTION OF THE ILLUSTRATIVE EMBODIMENTS

Figure 1:
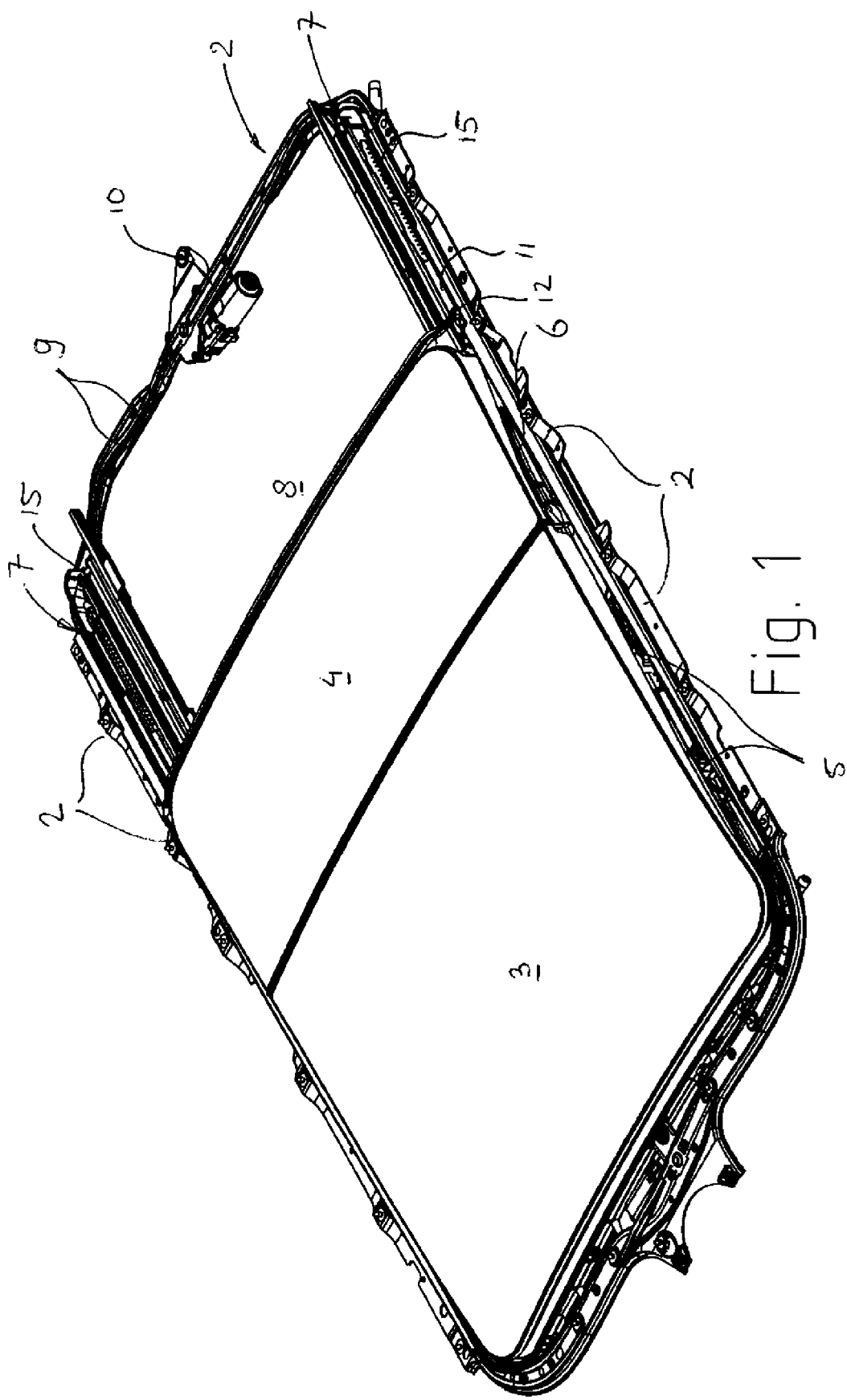
FIG. 1 is a perspective view of en embodiment of the roof assembly.
Figure 2:
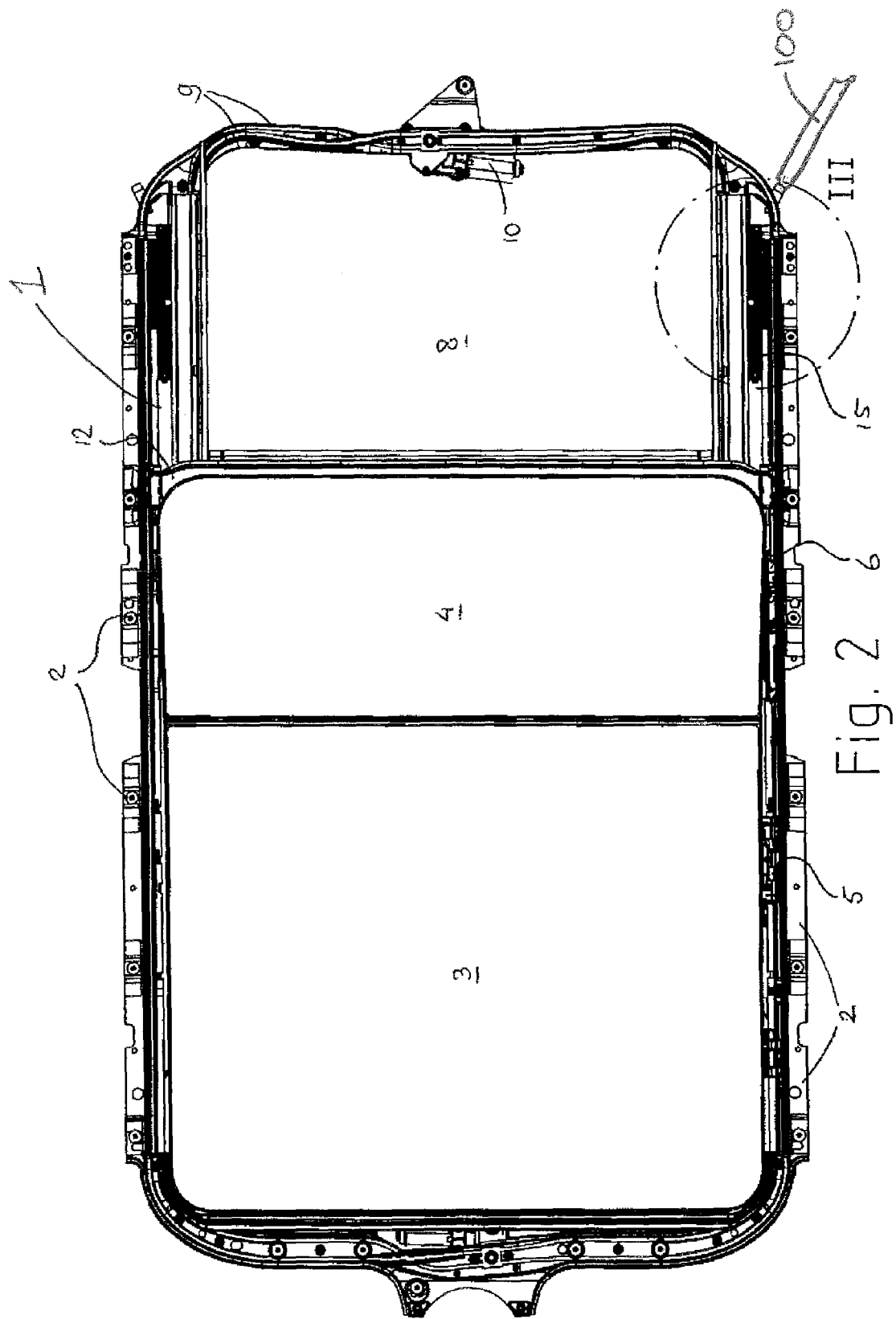
FIG. 2 is a plan view of the roof assembly of FIG. 1.

FIGS. 1 and 2 show an embodiment of a roof assembly for a vehicle, in particular a passenger car. The roof assembly comprises a stationary part, here in the form of a frame 1, having attachment elements 2 to fix the frame 1 to the bodywork of the vehicle. The roof assembly further comprises a closure in the form of one or more closure members, here in the form of a front glass panel 3 and a rear glass panel 4. Of course all kinds of other closure arrangements as known in the prior art are conceivable, such as slats, folding covers and the like. The panels 3, 4 can be positioned in a closed position in which they separately or jointly close an opening in the fixed roof of the vehicle. This fixed roof may be either part of the roof assembly or may be a part of the vehicle in which the roof assembly is mounted. The panels 3, 4 can be fixed, but in this embodiment they are both movable from their closed position in the roof opening to an open position in which they at least partly open the roof opening. In this particular embodiment the rear panel 4 can be moved from the closed position downwardly and rearwardly below a roof part of the vehicle that is present behind the roof opening.

In order to be able to move the panels 3, 4 they are mounted on their own operating mechanisms, here operating mechanisms 5, 6. Each panel 3, 4 has an operating mechanism 5, 6 attached under each longitudinal edge of the panel. The operating mechanisms 5, 6 are guided in longitudinal guides 7 provided on each longitudinal edge of the frame 1 and extending along a passage opening 8 in the frame 1. The operating mechanisms 5, 6 of the panels 3, 4 are controlled by means of a driving mechanism, here including drive cables 9 driven by one or more electric motors 10 or crank levers (not shown).

The frame 1 is provided with a water management system that is provided for draining water collected by the frame 1. The management system includes longitudinal drain channels 11, here guide channels formed in the longitudinal guides 7 and also acting to guide parts of the operating mechanisms 5, 6. It also includes a movable water gutter 12, arranged behind the rear panel 4 and being able to follow movements of the rear panel 4 when it is moved rearwardly. The water gutter 12 has ends terminating above the drain channels 11 in order to drain water from the water gutter 12 into the longitudinal drain channels 11. In order to drain the collected water to a position outside the roof assembly and preferably outside the vehicle, the frame 1 is provided with water drainage members 13 (FIG. 3) which are positioned at least on the rear end of the frame 1 substantially behind the longitudinal drain channels 11. The water drainage members 13 include a pipe-shaped part to which a water drainage hose 100 can be connected. The water may thus flow from the drain channels 11 through the water drainage members 13 into the hoses which end at a position near the bottom of the vehicle in order to allow the water to leave the vehicle.

FIGS. 3-10 show a part of the frame 1 at a location of the water drainage member 13 extending through a wall of the frame 1 and opening to a portion 14 of the frame which is located behind the water drain channel 11 and at a lower level so that the water may flow from the drain channel 11 to the portion 14 of the frame 1 and then into the water drainage member 13.

In practice it has been shown that debris, for example in the form of dirt and leaves can collect in the drain channels 11 and then in the portion 14 of the frame 1 in front of the opening of the water drainage member 13, thereby creating a risk of clogging the opening such that the water cannot leave the portion 14 which may lead to leakage of drain water from the frame 1 into the interior of the vehicle.

In order to minimize the risk of clogging of the water drainage member 13, an aspect of the invention proposes the use of a sieve member 15 which on the one hand catches the debris and on the other hand provides sufficient openings to allow water to flow through, also when the debris have been collected.

In the embodiment of FIGS. 3-10 the sieve member 15 is attached within the drain channel 11 of the longitudinal guides 7 at the rear end thereof. The sieve member 15 has a substantially U-shaped cross section and an elongate length extending between a first end 15a and a second end 15b. The elongate length of the sieve member 15 includes a plurality of drain openings 16 in the bottom 17 of the sieve member 15 (see FIGS. 5 and 8).

The cross section of the sieve member 15 is smaller than that of the drain channel 11, and below the bottom 17 of the sieve member 15 there is created a space 18 (see FIG. 8) to the bottom of the drain channel 11, so that water can flow from the drain openings 16 to the space 18 and then into the portion 14 of the frame 1. The elongated cross openings 16 also extend into the side walls 19 of the sieve member 15. The side walls 19 of the sieve member 15 are provided with positioning members 20, 21 in order to fix the lateral and vertical position of the sieve member 15 in the drain channel 11. Another positioning member 22 (see FIGS. 4 and 9) may be provided to fix the position of the sieve member 15 in longitudinal direction of the drain channel 11.

Figure 3:
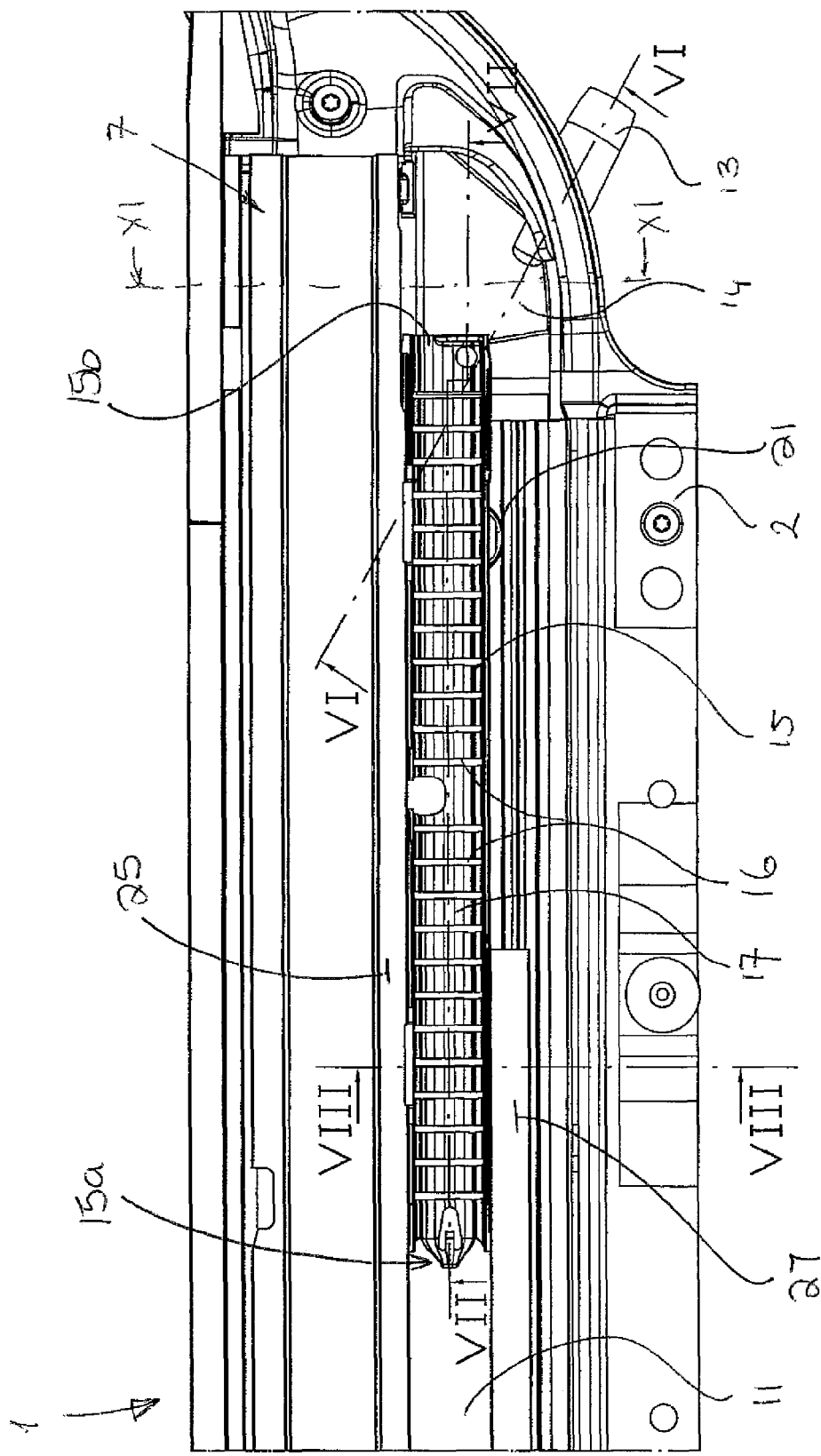
FIG. 3 shows detail III in FIG. 2 on a larger scale.
Figure 4:
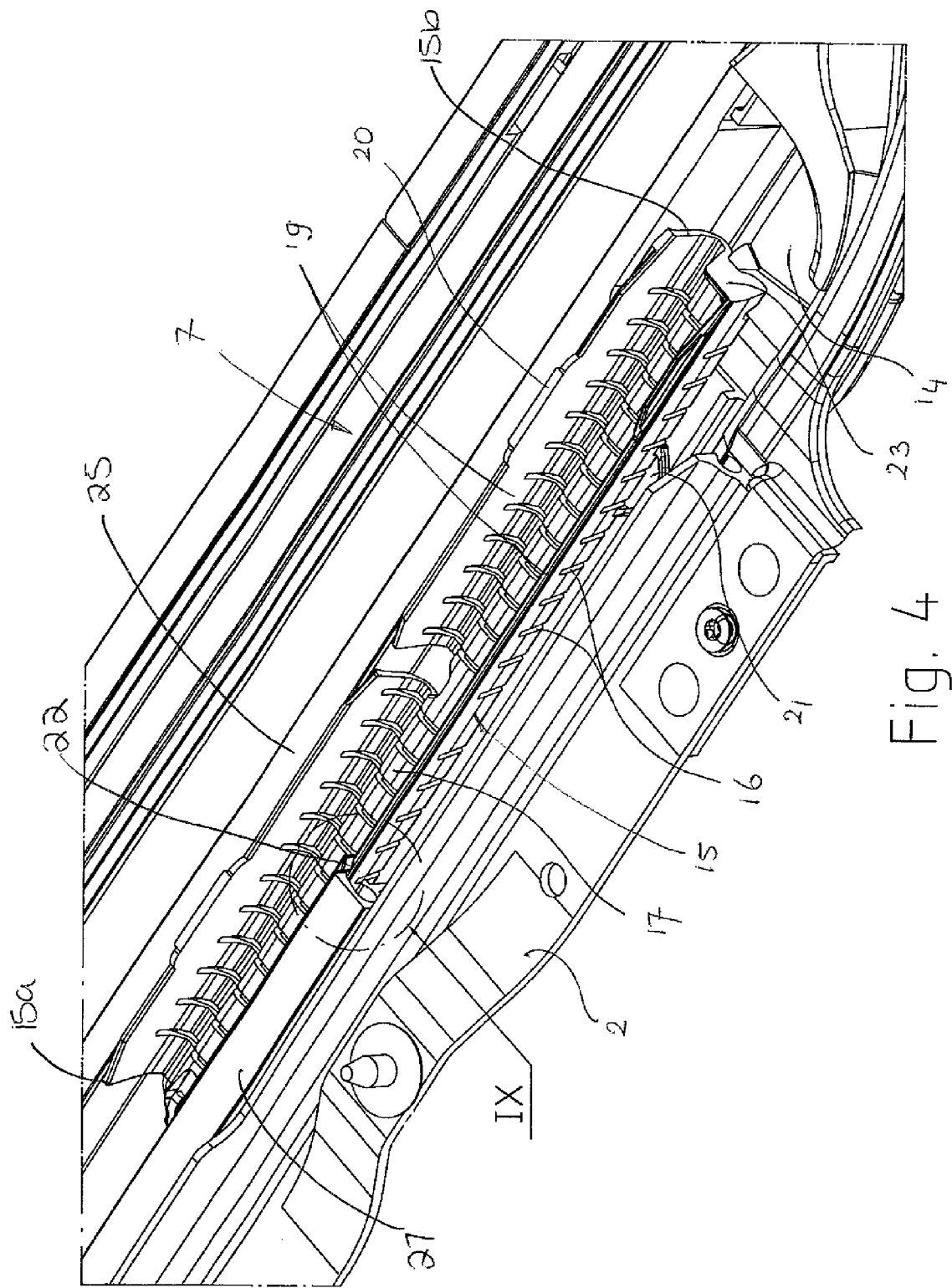
FIG. 4 is a perspective view of the subject of FIG. 3.
Figure 8:
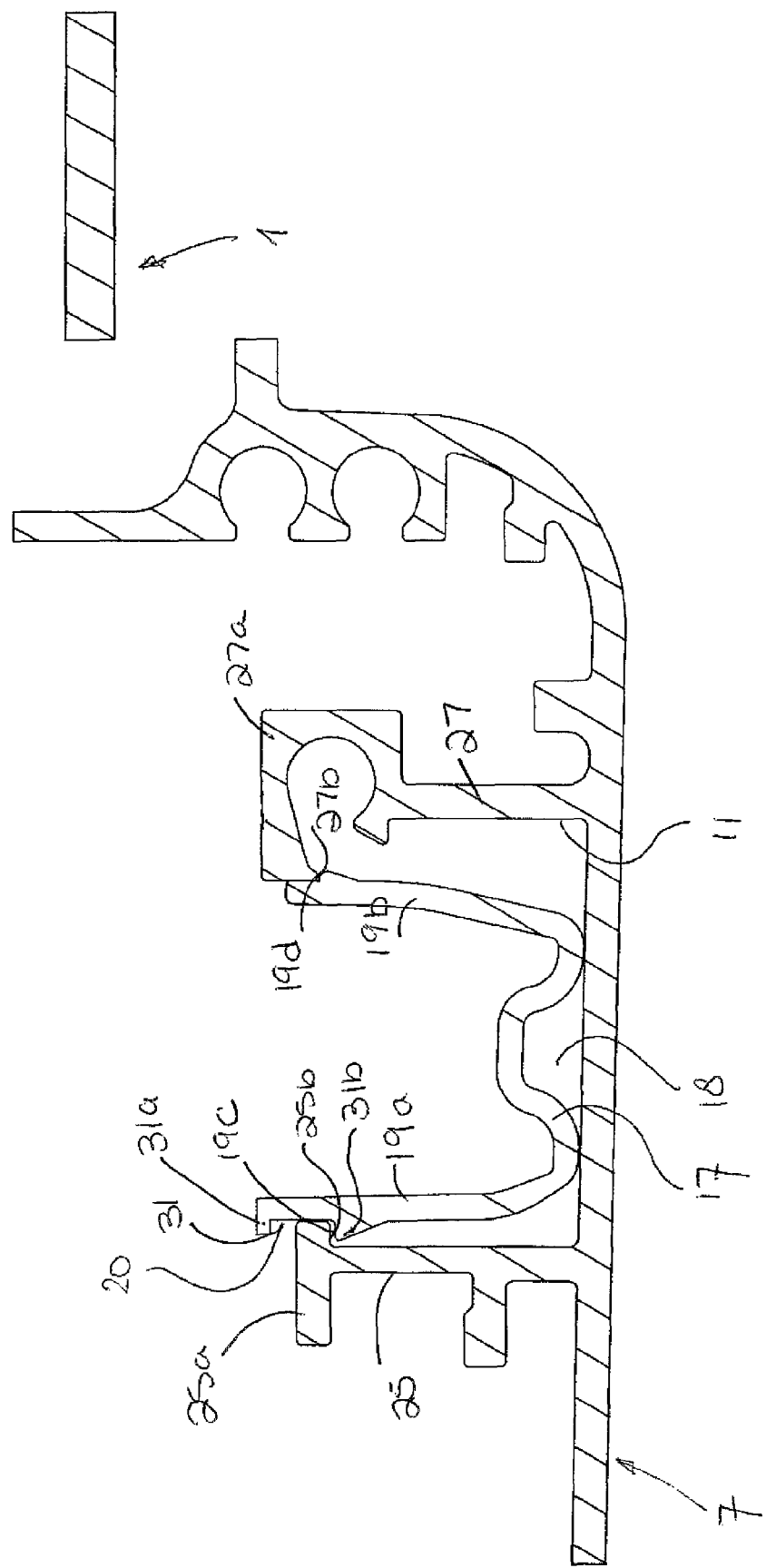
FIG. 8 is a sectional view along the line VIII-VIII in FIG. 3.

In FIGS. 3-4, the sieve member 15 is supported between upright supports 25, 27 along the drain channel 11. As shown, upright support 27 has a shortened length that terminates at a support end spaced from ends 15a and 15b of the sieve member 15. As shown in FIG. 8, upright support 25 includes a longitudinally extending rail portion 25a defining edge surface 25b along one side of the drain channel 11 and upright support 27 includes a longitudinally extending rail portion 27a defining edge surface 27b along an opposed side of the drain channel 11. As shown, the sieve member 15 is supported between upright supports 25,27 so that the side walls 19a and 19b of the sieve member 15 abut rail portions 25a and 27a. Side walls 19a and 19b include a protruding edge surface 19c and 19d that interface with edge surfaces 25b and 27b of the upright supports 25, 27 to fix the vertical position of the sieve member 15 in the drain channel 11.

In the embodiment shown in FIG. 8, side wall 19a includes a groove 31 between protruding edge portions 31a and 31b. As shown, an edge portion of rail 25a forms a tongue which extends into groove 31 and is slidable along the groove 31 to retain the vertical position of the sieve member 15.

Figure 5:
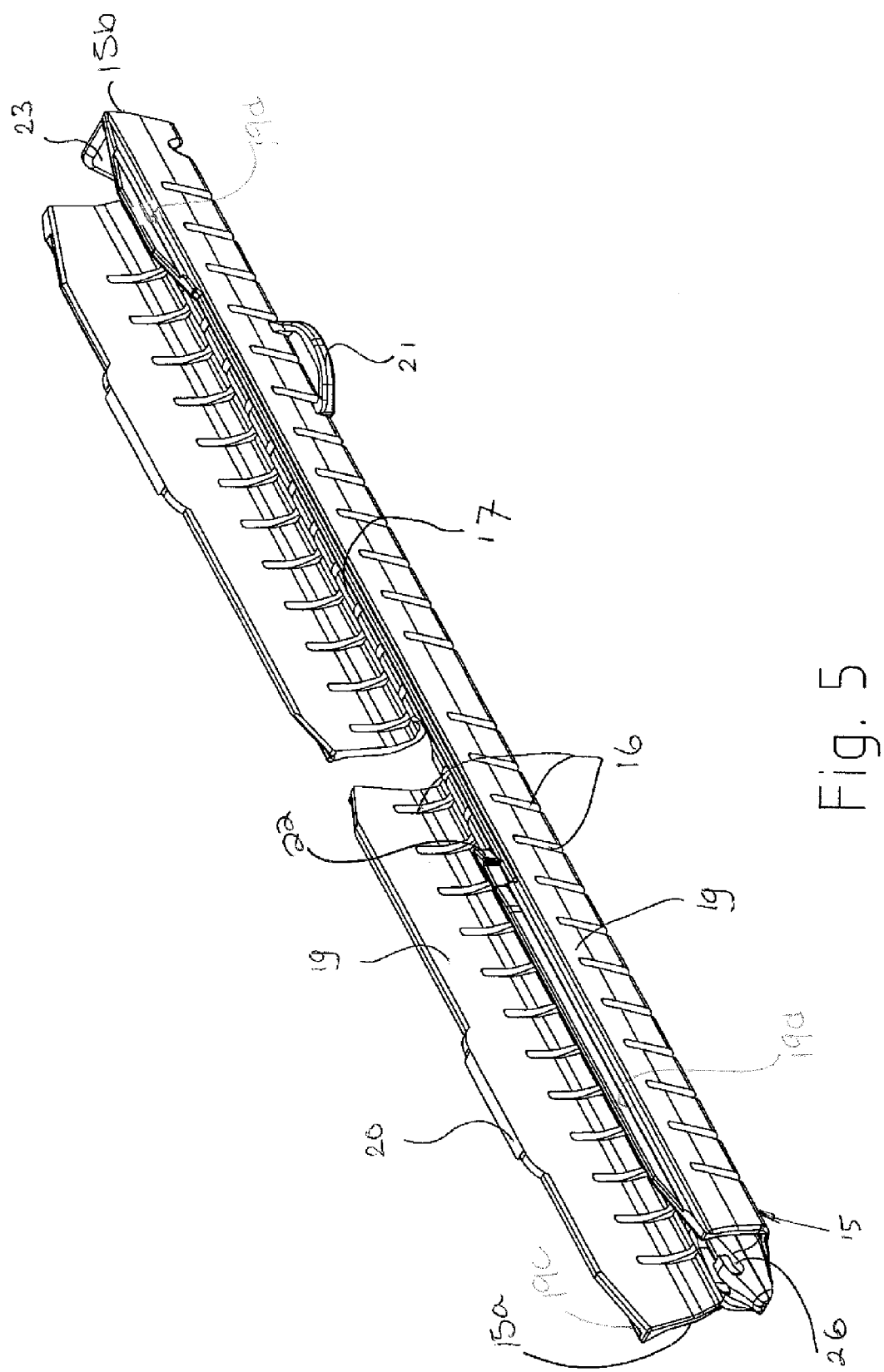
FIG. 5 is a perspective view of the sieve member used in the embodiment of FIGS. 1-4.
Figure 6:
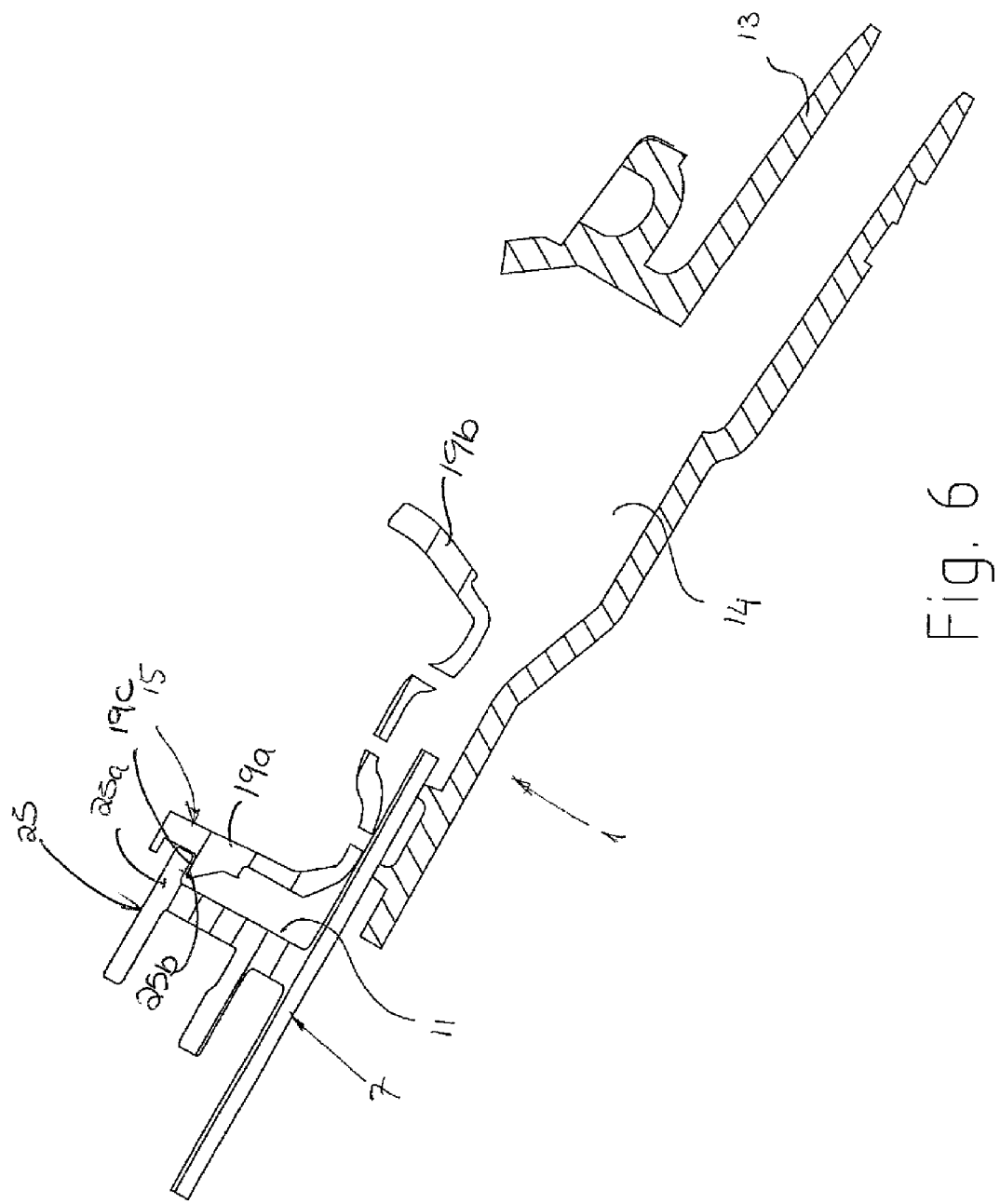
FIG. 6 is a sectional view along the line VI-VI in FIG. 3.
Figure 7:
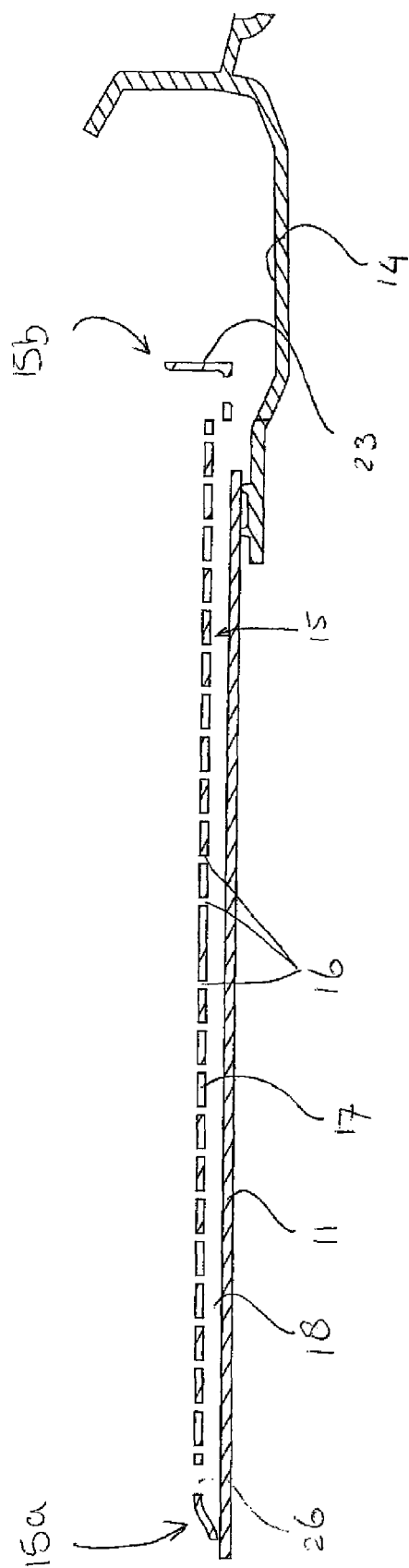
FIG. 7 is a sectional view along the line VII-VII in FIG. 3.

The sieve member 15 is retained laterally between upright supports 25 and 27 and side wall projection 21 shown in FIGS. 3 and 5. The upright supports 25 and 27 retain the lateral position along a length of the sieve member 15 extending along the upright support 27 and, side wall projection 21 retains the lateral position of the sieve member 15 along a remaining length portion.

Figure 9:
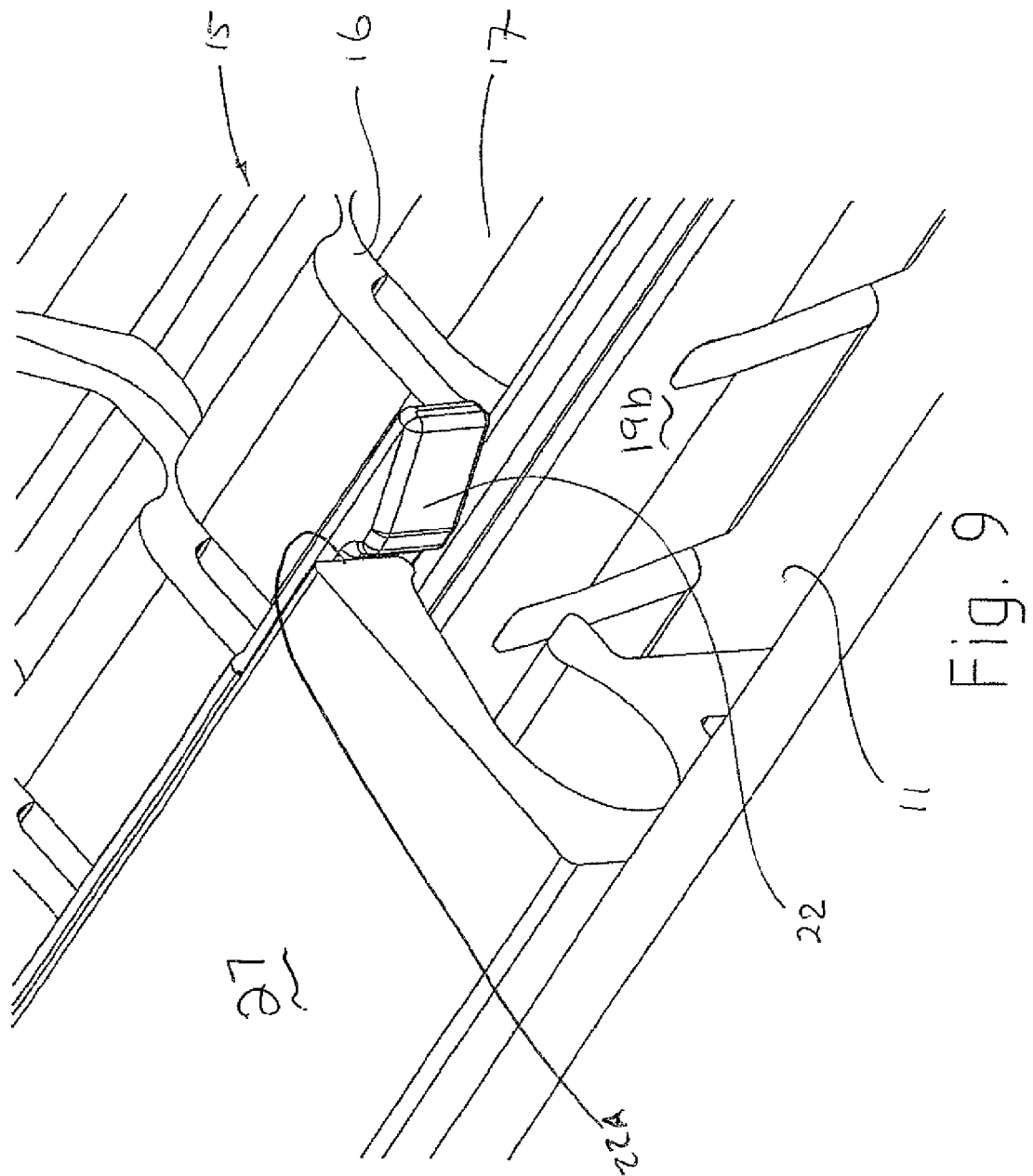
FIG. 9 shows detail IX in FIG. 4 on a larger scale.

The longitudinal position of the sieve member 15 is fixed via a flexible latch member 22 cooperatively engaging a latch surface 22a. As shown in FIG. 9, the latch member 22 is formed on the sieve member 15 and an end surface of the upright support 27 forms the latch surface 22a. The flexible latch member 22 includes sloped surfaces to engage and disengage the latch.

As shown in FIG. 3, the sieve member 15 is spaced forward from the drainage member or pipe 13 so that portion 14 is between end 15b of the sieve member 15 and the drainage member or pipe 13. The sieve member 15 has an end wall 23 to prevent the debris from entering the portion 14 behind the sieve member 15. The end wall 23 is not completely closed to form a passage to allow apart 24 of the water gutter 12 to pass the end wall 23 when the water gutter 12 is in its rearmost position with the rear panel 4 in its completely open position. However, hardly any debris will reach the end wall 23 as it will be caught by the sieve member 15 in positions spaced from the end wall 23.

This embodiment of the sieve member 15 can be used for new roof assemblies, so that the sieve members are mounted during the manufacturing process. However, the sieve member 15 can also be used as a service part which is mounted when the roof assembly is already in use. In this case the sieve members 15 should be brought into their position at the rear end of the frame which can hardly be reached because of the overlying fixed roof.

An aspect of the invention includes a method to bring the sieve members 15 into their positions of use without having to dismantle of demount the roof assembly. This method is schematically illustrated in FIGS. 15-18 and includes inserting the sieve member 15 from above into the drain channel 11 when a slide 25 of the operating mechanism 6 is in a forward position sufficient to insert the sieve member 15 such as a maximally forward position. In the embodiment illustrated, this position corresponds to a venting position of the rear panel 4 in which it is in an inclined position with its rear side moved upwardly. It should be noted for purposes of understanding aspects herein disclosed, the operating mechanism 6, and particularly, linkage 25A between the slide 25 and the rear panel 4 that causes movement of the rear panel 4 with movement of the slide 25 is not important. The linkage 25A is therefore represented herein schematically comprising a lever, pin and guide for the pin. As known by those skilled in the art, lever(s), pin(s) and guide(s) are well known and configured as necessary to move the panel 4 as desired. In this embodiment, the rear panel 4 tilts upwardly when the slide is in its forward most position; however, this should not be considered limiting in that in other embodiments the panel could be in its closed position as moved by the corresponding linkage. In addition, if desired portions of the connection of the panel 4 to the slide 25 (for example portions of linkage 25A) can be temporarily disconnected from one another during sieve member 15 installation, and if necessary, so as to allow more movement of the panel 4 to insert the sieve member 15.

Referring back to the illustrative embodiment of FIGS. 15-18, the slide 25 of the operating mechanism 5, 6 is conveniently positioned forwardly with respect to the drain channel 11, for example, forwardly of the rear side of the roof opening, so that it is possible to position the sieve member 15 by hand into the drain channel 11 at a position just behind the slide 25. The operating mechanisms 5, 6 are then moved rearwardly in the longitudinal guides and during this rearward movement of the slide 25 it pushes the sieve member 15 rearwardly to a position just in front of the position of use or into the position of use in which in this case the positioning or latch member 22 comes into engagement with a counter member or surface 22a in the longitudinal guide 7 to hold the sieve member 15 in place.

For service purposes, for example to clean the sieve member 15, use may be made of a retrieval tool 25B (FIG. 16) which is elongated so that it can be inserted into the drain channel 11 from a position at the roof opening while a hook at the distal end of the tool 25B may be brought into engagement with a projection 26 extending from the first end 15a of the sieve member 15 to engage the projection 26 with a hook end of the tool 25B to pull the sieve member 15 forward with the tool 25B to remove the sieve member 15 from the drain channel 11 for replacement or cleaning purposes. The positioning or latch member 22 (FIG. 9) should then be made such that it can be selectively disengaged from its counter member or surface 22A holding it in place. For example, the positioning or latch member 22 can comprise a spring biased flange or flexible portion of sieve member 15 that flexes as necessary relative to the counter member or surface 22A during installation or removal of the sieve member 15.

Figure 12:
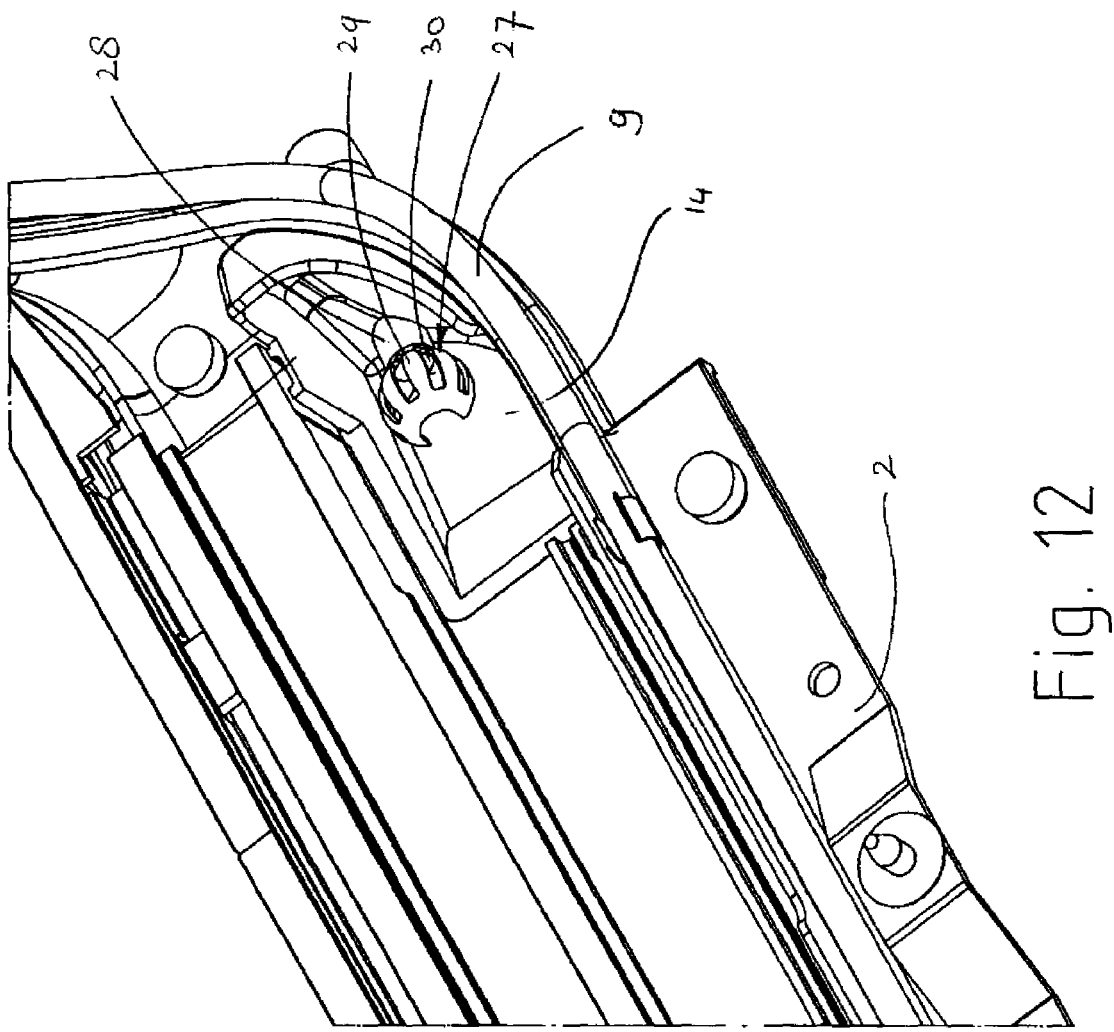
FIGS. 12-14 are perspective views of alternative embodiments of a sieve member assembled in their position in the roof assembly.
Figure 13:
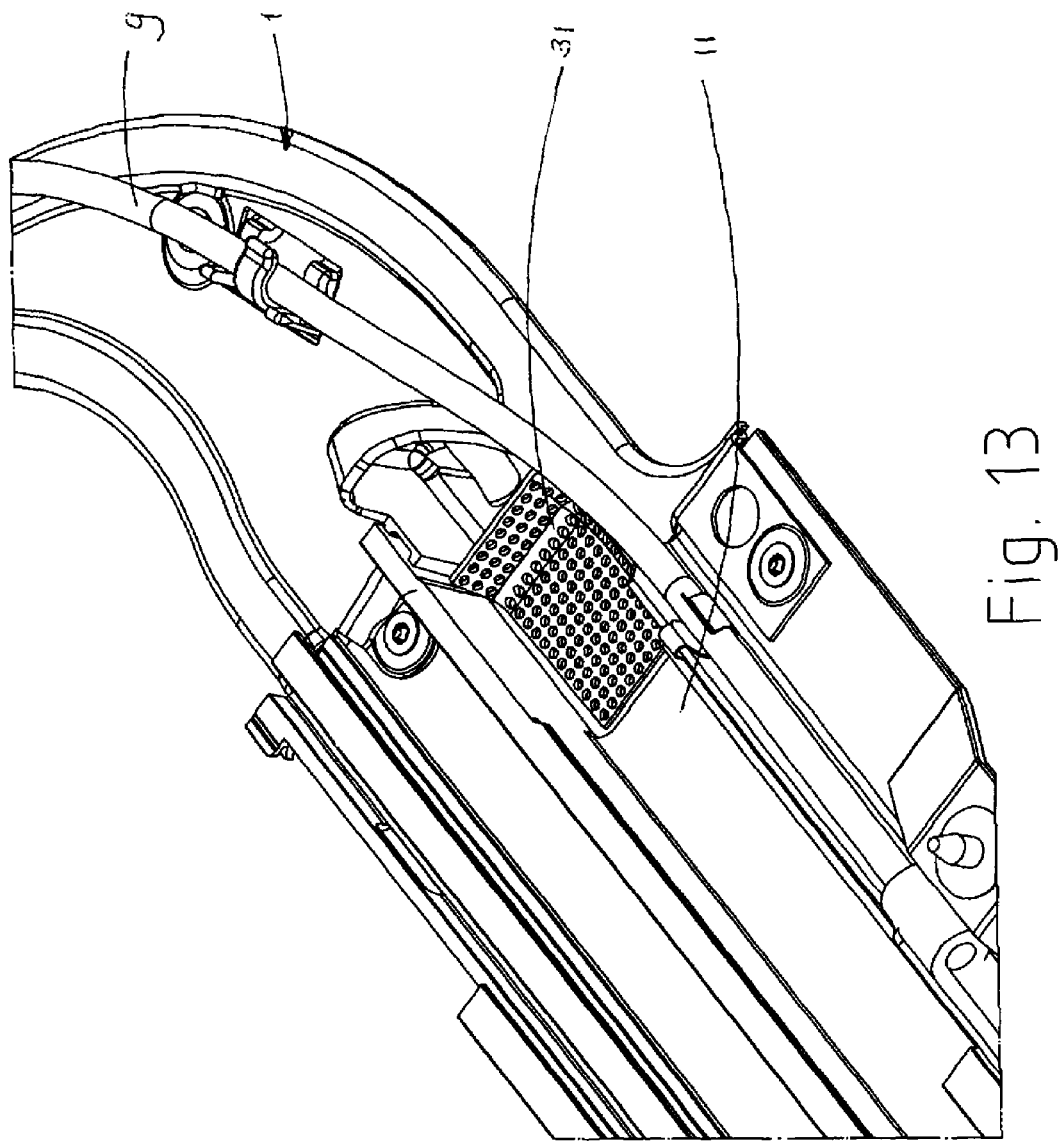
Figure 14:
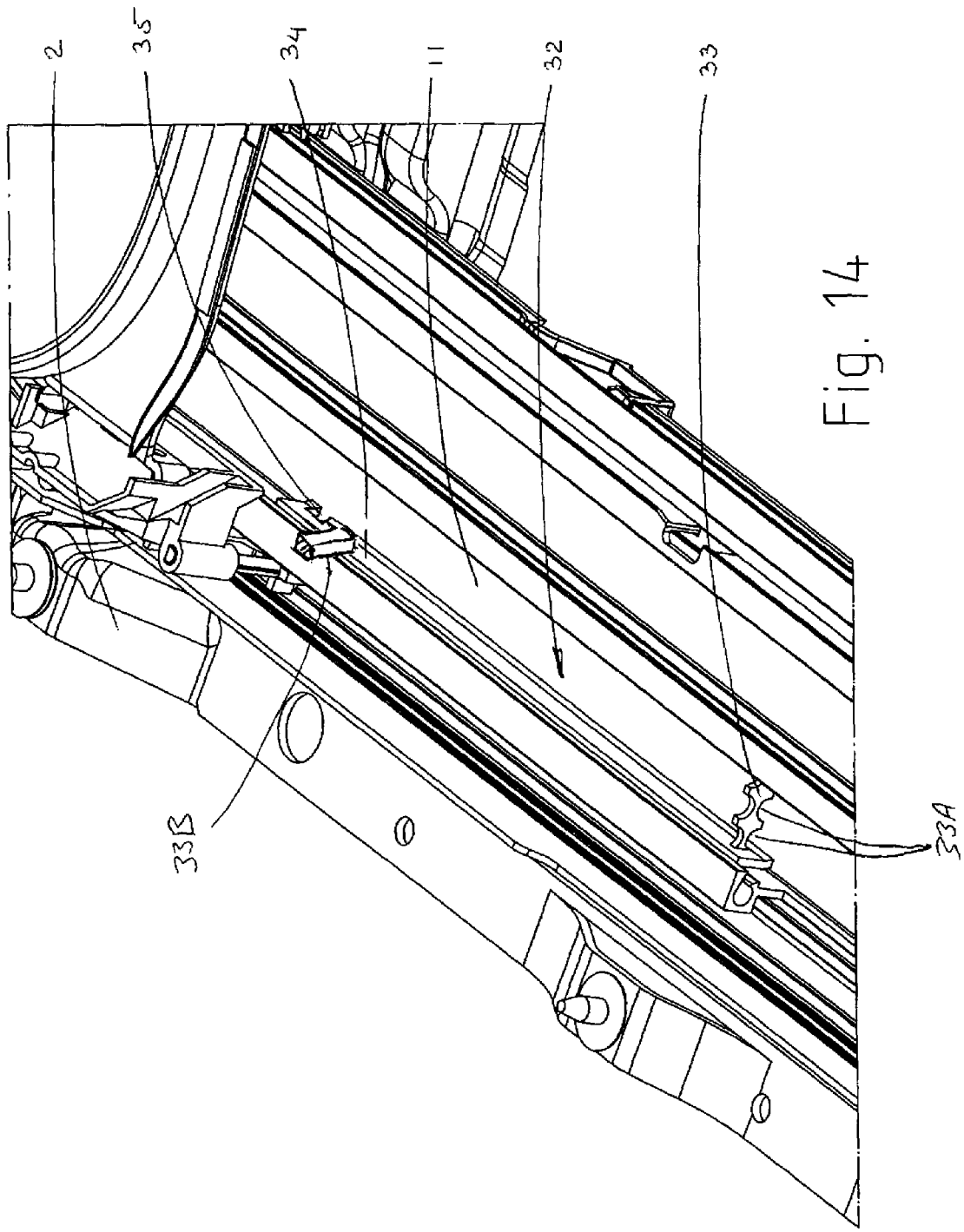
Figures 15, 16:
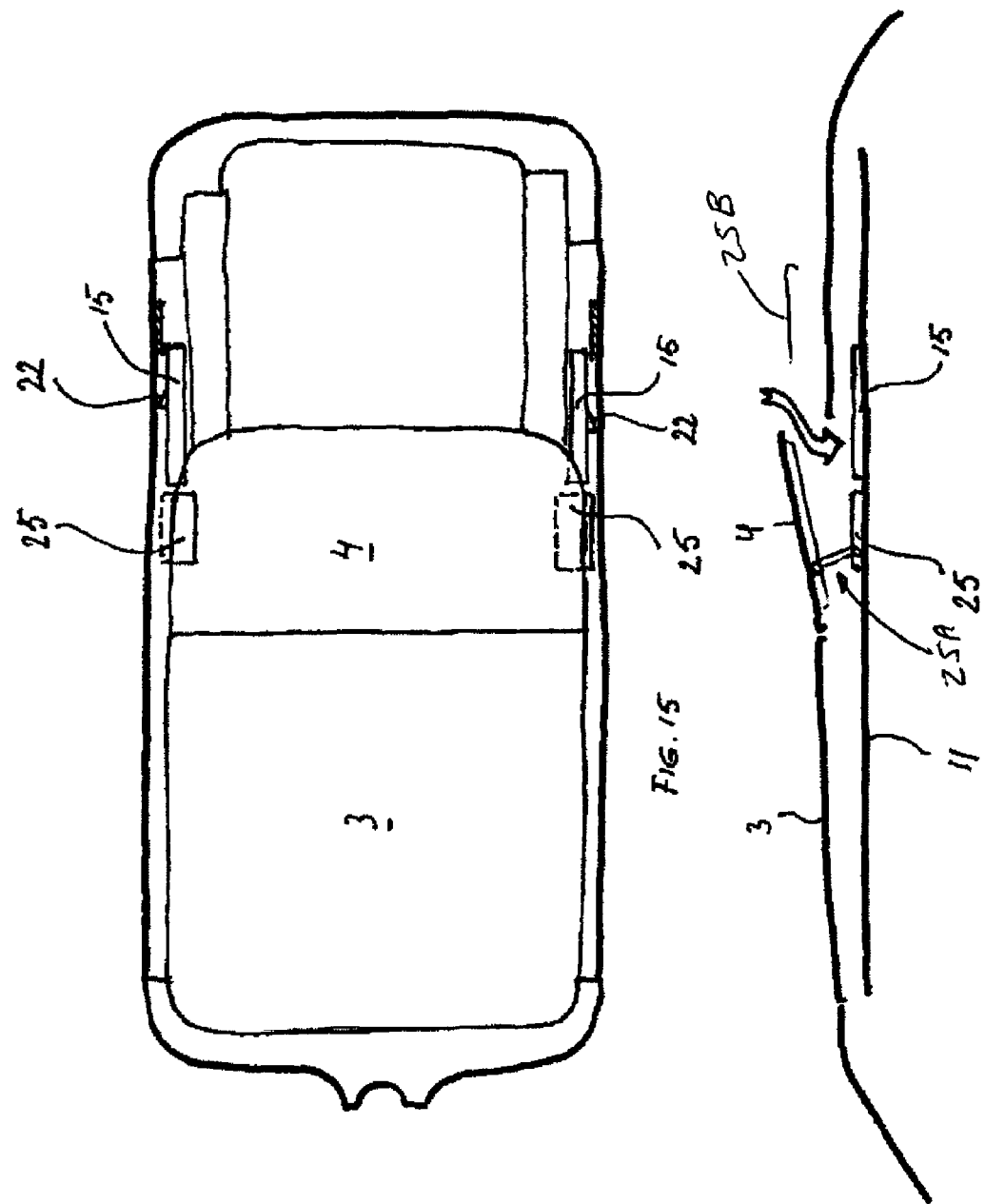

FIGS. 12-14 show alternative embodiments of the sieve member. FIG. 12 shows a sieve member 27 which can be mounted in front of the opening of the drainage member 13. It includes a pipe shaped part 28 for insertion into the water drainage member 13 and a hollow sieve 29 having a plurality of drain openings 30 distributed around the sieve 29 so that there will always be an unblocked drain opening even if an amount of debris has accumulated in the frame portion 14.

FIG. 13 shows an embodiment in which a sieve member 31 is formed on the frame at a position above the frame portion 14 and connecting to the rear end of the respective drain channel 11 such that debris from the drain channel 11 will be caught and collected by the sieve member 31.

Figure 10:
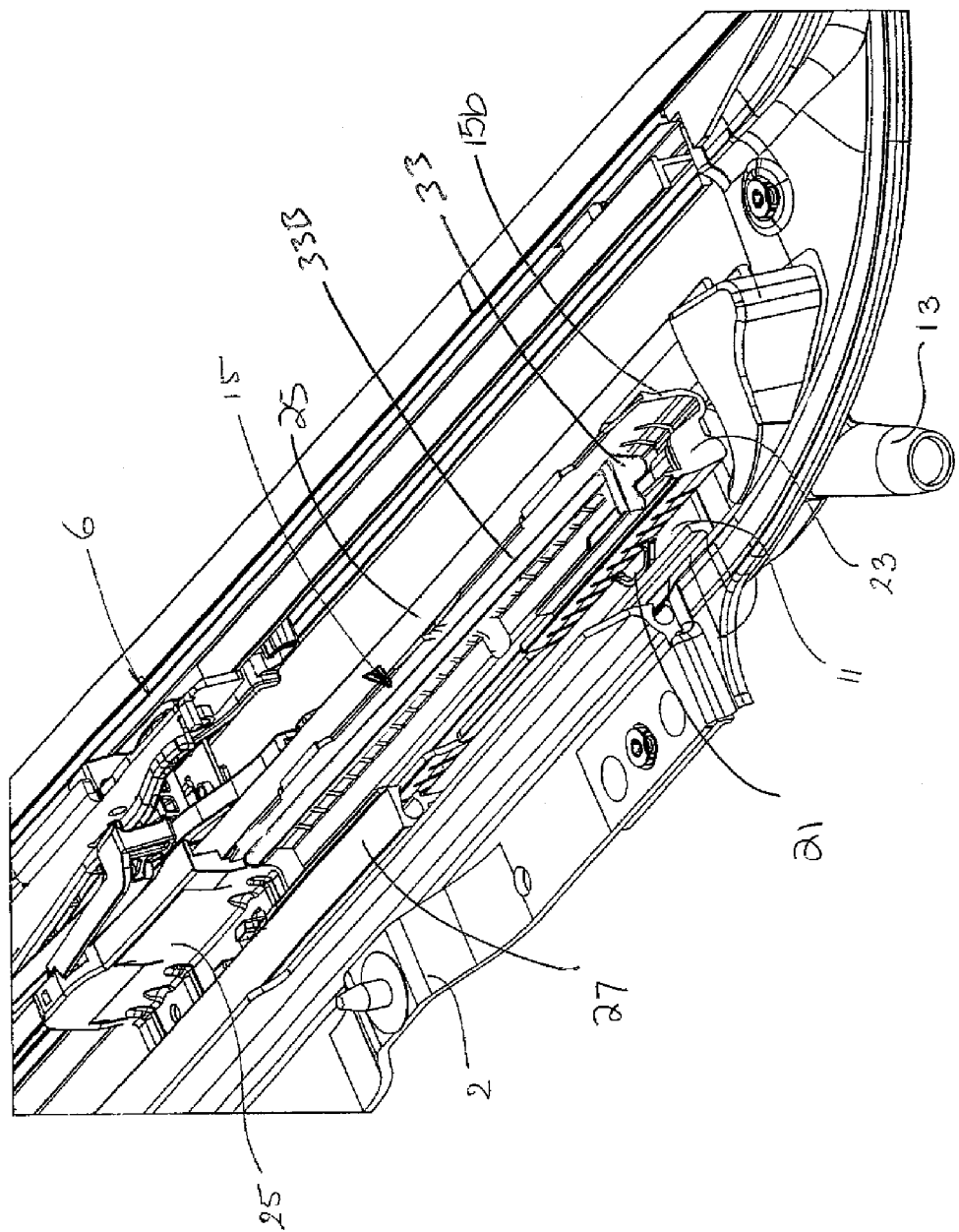
FIG. 10 is a perspective view similar to that of FIG. 4 but showing the closure operating mechanism of the roof assembly in its rearward position.
Figure 11:
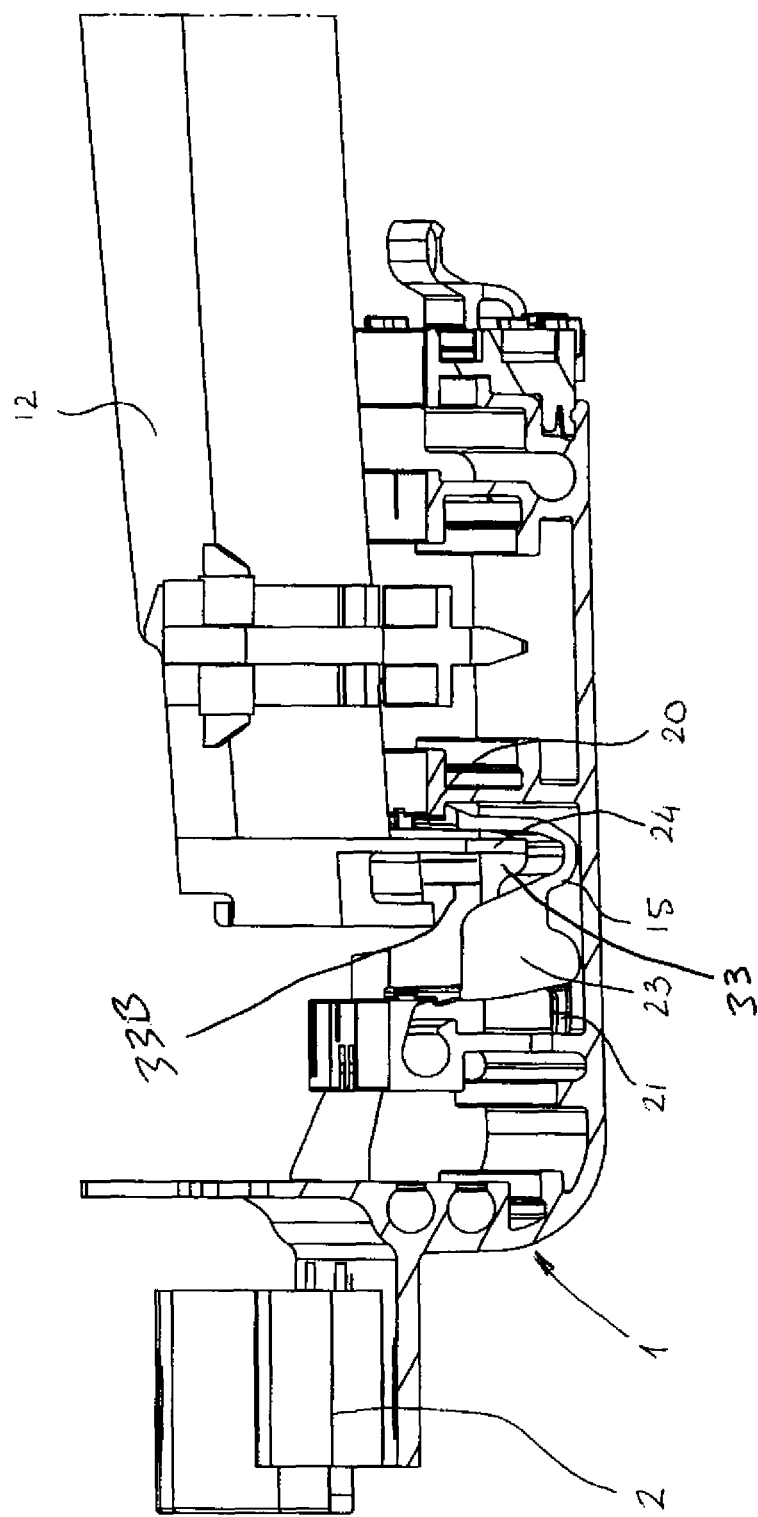
FIG. 11 is a sectional view according to the line XI-XI in FIG. 3, but showing a water gutter in its rearmost position.

FIG. 14 shows a sieve member 32 which comprises a scraper 33 (having apertures 33A) provided across the drain channel 11 and being connected to a control member 34 having a control recess 35 that can be engaged by a control tool (for example, tool 25B or the like) with which the scraper 33 can be pulled forwardly from its rear position in order to scrape debris from the drain channel 11 to a position where it can be removed from the drain channel 11 in a manner similar to that described above with respect to sieve member 15. As a variation thereof the scraper can be connected to the water gutter 12 or operating mechanism 5 or 6 directly or through a linkage, so that scraping movements are carried out every time the water gutter 12 and/or operating mechanism 5 or 6 is moving. The scraper 33 and linkage can be such that the scraper is only active if it is moved in forward direction. In the embodiment illustrated in FIG. 14, the direct connection of linkage is represented by the member 33B since the exact configuration will depend on the design and operation of water gutter 12 and/or operating mechanism 5, 6. FIG. 10 illustrates an exemplary connection of the scraper to slide 25, while FIG. 11 illustrates an exemplary connection to water gutter 12.

It should also be noted scraper 33 (with or without apertures 33A) can be used with other sieve members such as but not limited to sieve member 15 in FIG. 10.

In the embodiments described, the sieve member is positioned upstream of the drainage member within the water drain.

From the forgoing it will be clear that the invention provides a roof assembly having a sieve member which is effectively preventing blockage of the drain thereby preventing a leakage of drain water into the vehicle.

The invention is not limited to the embodiments shown in the drawings and described above, which may be varied in different manners within the scope of the accompanying claims. For example, sieve members can be used in other positions within the frame depending on the position of drain members that cannot be easily reached by hand to remove debris. The water drainage hose may also be replaced by another conduit connected to or formed on the water drainage member.

What is claimed is:

1. A roof assembly for a vehicle having a roof opening in its fixed roof, comprising:
   a stationary part comprising longitudinal guides positioned on either side of the roof opening,
   a closure movable at least between a closed position closing the roof opening and an open position in which the closure is at least partly opening the roof opening,
   a closure operating mechanism for opening and closing said closure, said operating mechanism sliding in said longitudinal guides when opening and closing said closure, and wherein said longitudinal guides each comprise at least a drain channel and a water drainage member for draining water from said drain channel, each water drainage member communicating with the respective drain channel on one end, and having an outlet on an opposite end, and
   a sieve member for catching debris including one or more openings, wherein the sieve member is provided in the drain channel upstream of said water drainage member, and wherein the sieve member has an elongate length and a latch assembly configured to retain a longitudinal position of the sieve member in the drain channel, the latch assembly including a flexible latch member cooperatively engaging a latch surface.

2. The roof assembly of claim 1, and further comprising a scraper configured to be selectively displaced along the sieve member and/or at least one of said longitudinal guides.

3. The roof assembly of claim 2 wherein the scraper includes apertures configured to allow water flow.

4. A method of mounting a sieve member to a vehicle comprising a roof assembly having a stationary part having longitudinal guides positioned on either side of a roof opening of the vehicle, a closure movable at least between a closed position closing the roof opening and an open position in which the closure is at least partly opening the roof opening, a closure operating mechanism for opening and closing said closure, said operating mechanism sliding in said longitudinal guides when opening and closing said closure, wherein said longitudinal guides each comprise at least a drain channel and a water drainage member communicating with the drain channel on one end, and wherein the closure operating mechanism is operably arranged to slide the sieve member along the drain channel toward the water, drainage member, the method comprising:
   setting the closure operating mechanism in an open position in the longitudinal guides to access the drain channel;
   positioning the sieve member in the drain channel in a position behind the operating mechanism; and
   moving the sieve member toward the water drainage member to its position of use, wherein moving the sieve member comprises actuating the closure operating mechanism to move the sieve member toward the water drainage member and at least partly to its position of use.

5. The roof assembly of claim 1 wherein the sieve member is formed of a generally U-shaped member having a bottom portion and opposed side walls and the bottom portion includes a raised surface between spaced bottom surfaces which rest on the drain channel and the raised surface is elevated from a surface of the drain channel to form a space for water flow.

6. A roof assembly for a vehicle having a roof opening in its fixed roof, comprising:
   a stationary part comprising longitudinal guides positioned on either side of the roof opening,
   a closure movable at least between a closed position closing the roof opening and an open position in which the closure is at least partly opening the roof opening,
   a closure operating mechanism for opening and closing said closure, said operating mechanism sliding in said longitudinal guides when opening and closing said closure, and wherein said longitudinal guides each comprise at least a drain channel and a water drainage member for draining water from said drain channel, each water drainage member communicating with the respective drain channel on one end, and having an outlet on an opposite end, and
   a sieve member for catching debris including one or more openings, wherein the sieve member is provided in the drain channel upstream of said water drainage member, wherein the sieve member has an elongate length extending from a first end to a second end and the first end includes a projection, the sieve member being retained in a fixed position in the drain channel under the fixed roof, the sieve member comprising a latch assembly to retain a longitudinal position of the sieve member in the drain channel including a flexible latch member cooperatively engaging a latch surface, and further comprising a removal tool of length to extend longitudinally along the drain channel and having an end shaped for engagement with the projection so as to pull the sieve member along the drain channel, wherein the sieve member has first and second side walls disposed between upright supports along the drain channel, the upright supports including elongate rail forming edge surfaces along a length of the drain channel and each of the side walls of the sieve member includes a protruding edge surface that abuts the edge surfaces of the elongate rails to guide the sieve member in the drain channel during sliding and inhibit vertical separation of the sieve member with the drain channel.

7. The roof assembly of claim 1 wherein the drainage member includes a drainage tube and the sieve member has an elongate length extending between first and second ends and is separate from and spaced from the drainage tube.

8. The roof assembly of claim 1 and further comprising a water gutter coupled to and moveable with the closure and the water gutter having a gutter part movable along the drain channel between a first position to a second position aligned relative to a drain portion between the sieve member and the drainage member.

9. A roof assembly for a vehicle having a roof opening in its fixed roof, comprising:
   a stationary part comprising longitudinal guides positioned on either side of the roof opening,
   a closure movable at least between a closed position closing the roof opening and an open position in which the closure is at least partly opening the roof opening,
   a closure operating mechanism for opening and closing said closure, said operating mechanism sliding in said longitudinal guides when opening and closing said closure, and wherein said longitudinal guides each comprise at least a drain channel and a water drainage member for draining water from said drain channel, each water drainage member communicating with the respective drain channel on one end, and having an outlet on an opposite end, a sieve member for catching debris including one or more openings, wherein the sieve member is provided in the drain channel upstream of said water drainage member, a water gutter coupled to and moveable with the closure and the water gutter having a gutter part movable along the drain channel between a first position to a second position aligned relative to a drain portion between the sieve member and the drainage member, and wherein the sieve member includes an elongate length having a first end and a second end located proximate to the drain portion wherein the second end includes a transverse end wall having a passage opening sized for passage of the gutter part therethrough.

10. The roof assembly of claim 1 wherein the sieve member includes first and second side walls and a bottom portion along the elongate length and the one or more openings comprise a plurality of elongate slots spaced along the elongate length of the sieve member, the slots having a width that extends from the first side wall to the second side wall and along the bottom portion.

11. The roof assembly of claim 1 wherein the elongate length of the sieve member extends from a first end to a second end and the first end includes a projection shaped for engagement by a removal tool to remove the sieve member from the drain channel.

12. A roof assembly for a vehicle having a roof opening in its fixed roof, comprising:
a stationary part comprising longitudinal guides positioned on either side of the roof opening,
a closure movable at least between a dosed position closing the roof opening and an open position in which the closure is at least partly opening the roof opening,
a closure operating mechanism for opening and closing said closure, said operating mechanism sliding in said longitudinal guides when opening and closing said closure, and wherein said longitudinal guides each comprise at least a drain channel and a water drainage member for draining water from said drain channel, each water drainage member communicating with the respective drain channel on one end, and having an outlet on an opposite end, and
a sieve member for catching debris including one or more openings, wherein the sieve member is provided in the drain channel upstream of said water drainage member, wherein the sieve member has an elongate length having first and second side walls disposed between upright supports along the drain channel, the upright supports including elongate rail forming edge surfaces along a length of the drain channel and each of the side walls of the sieve member includes a protruding edge surface that abuts the edge surfaces of the elongate rails to retain the sieve member in the drain channel.

13. The roof assembly of claim 12 wherein one of the side walls of the sieve member includes an elongate groove formed between protruding edge portions and one of the edge surfaces of the rails forms a tongue slideable along the elongate groove.

14. The roof assembly of claim 12 wherein a first upright support coextends along a first side wall of the sieve member and a second upright support extends along a second side wall of the sieve member and the second upright support has a shortened length to provide a support end spaced from first and second ends of the sieve member.

15. The roof assembly of claim 14 wherein the shortened length of the second upright support forms a latch surface to engage a flexible latch member on the sieve member to retain a longitudinal position of the sieve member in the drain channel.

16. The roof assembly of claim 14 wherein the sieve member includes a side wall projection configured to engage a side wall of the drain channel between the support end and the second end of the sieve member to retain a transverse position of the sieve member.

17. The roof assembly of claim 12 wherein the sieve member comprises a latch assembly to retain a longitudinal position of the sieve member in the drain channel, the latch assembly including a flexible latch member cooperatively engaging a latch surface.

18. The roof assembly of claim 17 wherein the flexible latch member includes opposing sloped surfaces to engage and disengage the latch member against the latch surface.

19. The method of claim 4 wherein the sieve member has an elongate length having first and second side walls disposed between upright supports along the drain channel, the upright supports including elongate rail forming edge surfaces along a length of the drain channel and each of the side walls of the sieve member includes a protruding edge surface and wherein moving the sieve member by the closure operating mechanism causes the protruding edge surfaces of the sieve member to engage the edge surfaces of the elongate rails to retain the sieve member in the drain channel.

20. The method of claim 19 wherein a portion of the sieve member and a portion of the drain channel form a latch assembly including a flexible latch member cooperatively engaging a latch surface to retain a longitudinal position of the sieve member, and wherein moving the sieve member by the closure operating mechanism in the drain channel causes the flexible latch member to engage the latch surface to retain the sieve member in the longitudinal position.

21. The roof assembly of claim 1 wherein the flexible latch member includes opposing sloped surfaces to engage and disengage the latch member against the latch surface.

22. The roof assembly of claim 21 wherein the sieve member has an elongate length having first and second side walls disposed between upright supports along the drain channel, the upright supports including elongate rail forming edge surfaces along a length of the drain channel and each of the side walls of the sieve member includes a protruding edge surface that abuts the edge surfaces of the elongate rails to retain the sieve member in the drain channel.

23. The roof assembly of claim 22 wherein one of the side walls of the sieve member includes an elongate groove formed between protruding edge portions and one of the edge surfaces of the rails forms a tongue slideable along the elongate groove.

* * * * *